US006541879B1

(12) United States Patent  
Wright

(10) Patent No.: US 6,541,879 B1  
(45) Date of Patent: Apr. 1, 2003

(54) USB HUB POWER MANAGEMENT

(75) Inventor: David G. Wright, Woodinville, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/816,963

(22) Filed: Mar. 23, 2001

(51) Int. Cl.[7] .................................................. H02J 1/00
(52) U.S. Cl. ........................ 307/31; 710/313; 713/340; 361/18
(58) Field of Search ............................. 710/313; 307/11, 307/31, 38, 39, 42; 361/18, 93.1; 714/40, 14; 713/300, 320, 330, 340; 709/208

(56) References Cited

U.S. PATENT DOCUMENTS

| | | | |
|---|---|---|---|
| 4,419,723 A | 12/1983 | Wilson, Jr. .................... 363/21 |
| 4,626,697 A | 12/1986 | Nelson ......................... 307/18 |
| 4,675,770 A | 6/1987 | Johansson ..................... 361/18 |
| 5,467,009 A | 11/1995 | McGlinchey ................. 323/269 |
| 5,475,271 A | 12/1995 | Shibasaki et al. .............. 307/31 |
| 5,483,656 A | 1/1996 | Oprescu et al. .............. 395/750 |
| 5,514,859 A | 5/1996 | Seigel ......................... 235/462 |
| 5,522,081 A | 5/1996 | Carls .......................... 395/750 |
| 5,603,040 A | 2/1997 | Frager et al. ................ 395/750 |
| 5,606,704 A | 2/1997 | Pierce et al. ................. 395/750 |
| 5,675,813 A | 10/1997 | Holmdahl .................... 395/750 |
| 5,787,014 A | 7/1998 | Hall et al. .................... 364/492 |
| 5,799,196 A | 8/1998 | Flannery ................... 395/750.03 |
| 5,818,780 A | 10/1998 | Manning ...................... 365/226 |
| 5,884,086 A | 3/1999 | Amoni et al. ............ 395/750.01 |
| 5,938,770 A | 8/1999 | Kim ............................ 713/300 |
| 5,952,733 A | 9/1999 | Johnston ...................... 307/44 |
| 6,000,042 A | 12/1999 | Henrie ......................... 714/40 |
| 6,009,034 A | 12/1999 | Manning ...................... 365/226 |
| 6,058,026 A | 5/2000 | Rozman ....................... 363/16 |
| 6,064,554 A | 5/2000 | Kim ............................ 361/64 |
| 6,072,681 A | 6/2000 | Cogan et al. ................ 361/106 |
| 6,094,040 A | 7/2000 | Meier et al. ................. 323/284 |
| 6,105,097 A | 8/2000 | Larky et al. ................. 710/129 |
| 6,137,188 A | 10/2000 | Mitchell et al. .............. 307/29 |
| 6,240,522 B1 * | 5/2001 | Stufflebeam ................. 710/313 |

* cited by examiner

*Primary Examiner*—Shawn Riley
(74) *Attorney, Agent, or Firm*—Christopher P. Maiorana, P.C.

(57) ABSTRACT

An apparatus including a controller, a voltage supply circuit and a power management circuit. The controller may include one or more ports. The voltage supply circuit may be configured to generate an unregulated voltage supply. The power management circuit may be configured to receive the unregulated voltage supply and present a regulated power supply voltage to each of the one or more ports. In one example, the apparatus may be implemented in a Universal Serial Bus (USB) hub.

20 Claims, 2 Drawing Sheets

USB HUB POWER MANAGEMENT

FIELD OF THE INVENTION

The present invention relates to a method and/or architecture for power management generally and, more particularly, to a method and/or architecture for implementing Universal Serial Bus (USB) hub power management.

BACKGROUND OF THE INVENTION

Conventional power management for USB hubs requires costly regulated DC power supplies, costly monolithic power switching devices and/or overcurrent detection devices. Furthermore, overcurrent detection methods are over-sensitive to transient current spikes.

Referring to FIG. 1, a conventional USB power management circuit 10 is shown. The circuit 10 comprises a regulated power supply 12, a controller 14 and a number of power switching and monitoring devices 16a–16n. Each of the power switching and monitoring devices 16a–16n are implemented as monolithic devices. The switching and monitoring devices 16a–16n provide power control and over current detection to the controller 14.

SUMMARY OF THE INVENTION

The present invention concerns an apparatus comprising a controller, a voltage supply circuit and a power management circuit. The controller may include one or more ports. The voltage supply circuit may be configured to generate an unregulated voltage supply. The power management circuit may be configured to receive the unregulated voltage supply and present a regulated power supply voltage to each of the one or more ports.

The objects, features and advantages of the present invention include providing a method and/or architecture for implementing Universal Serial Bus (USB) hub power management that may (i) provide overcurrent detection, (ii) provide port overcurrent detection in a USB hub, (iii) implement a "shutdown" feature of a voltage regulator to provide port power switching and/or (iv) reduce production costs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Typical self-powered USB hubs may be powered using a relatively expensive regulated DC power supply. The USB device may be compliant with the USB specification version 1.0 (published November 1996), the USB specification version 1.1 (published September 1998), and/or the USB specification version 2.0 (published April 2000), each of which are hereby incorporated by reference in their entirety.

Each of the revisions to the USB specifications require the capability to supply 0.5A per downstream port. A typical 4-port hub may comprise a 2.5A supply (e.g., 2.0A for the downstream ports and 0.5A to power the hub). Furthermore, the hub may supply a margin for downstream devices that might draw more current than the USB specification allows.

One of the reasons for the high cost of a 12.5W regulated DC supply is the high cost of a 2.5A voltage regulator, which is typically more than the cost of four 500 mA regulators. An unregulated AC power supply may be implemented as a suitably packaged step-down transformer. An unregulated AC power supply may lend itself to low cost manufacturing. Unregulated AC supplies are readily available at low costs.

The USB specification permits hubs to provide either (i) an independent switch for each port (e.g., per port) or (ii) a single switch for all ports together (e.g., ganged). The USB specification also requires self-powered hubs to detect any dangerous conditions (e.g., an overcurrent condition) on the downstream ports. Specifically, the hub may provide overcurrent detection at a threshold well above the 500 mA level.

Typically, power switching and overcurrent detection is implemented using monolithic devices that switch the current and monitor for an overcurrent condition. Such devices are relatively expensive (e.g., in the range of $0.25+ per port). Also, the cost of a 12.5W, 5.0V regulated DC power supply is high, often approaching the cost of the hub itself.

Figure 1:
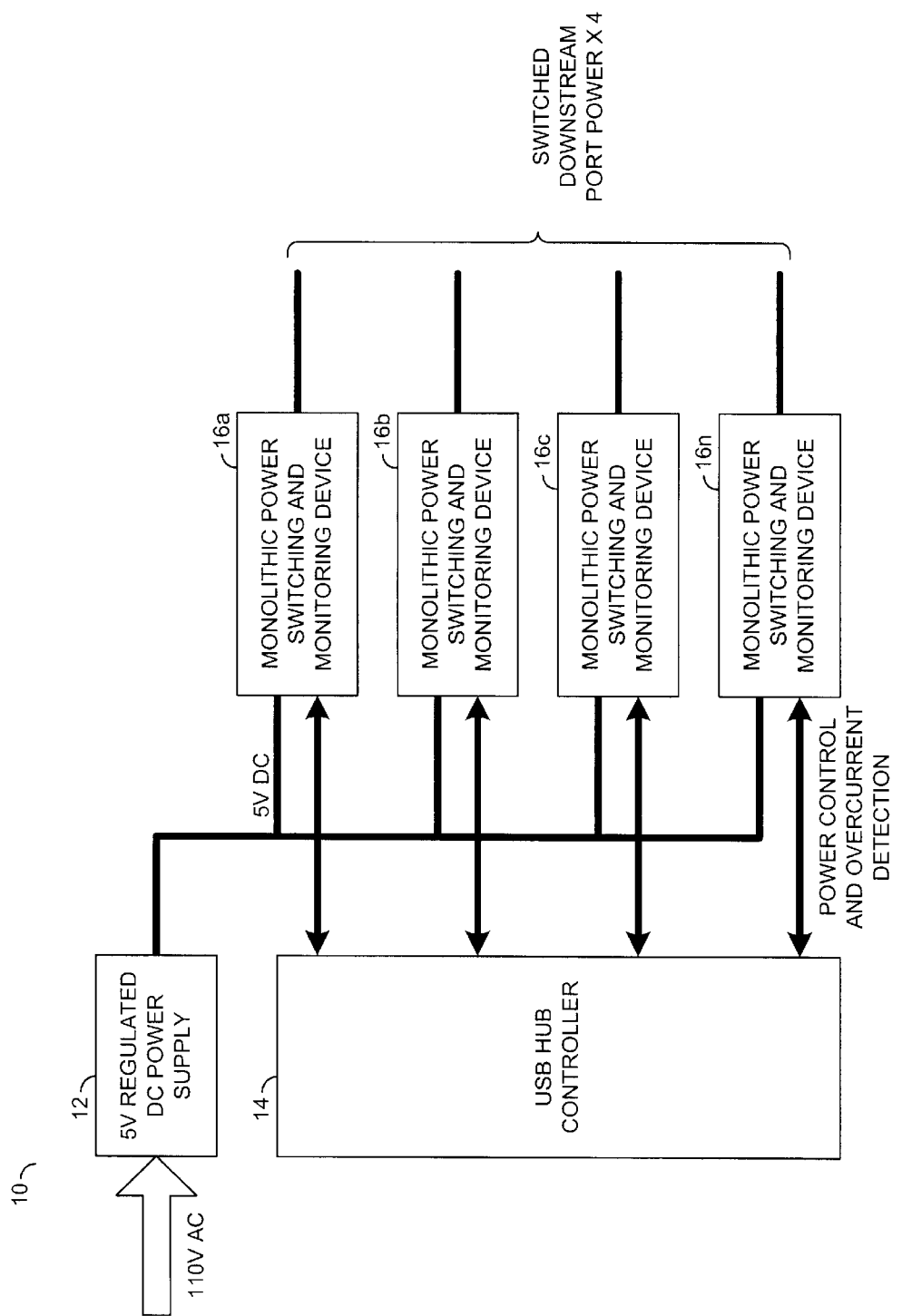
FIG. 1 is a block diagram of a conventional hub power management circuit.
Figure 2:
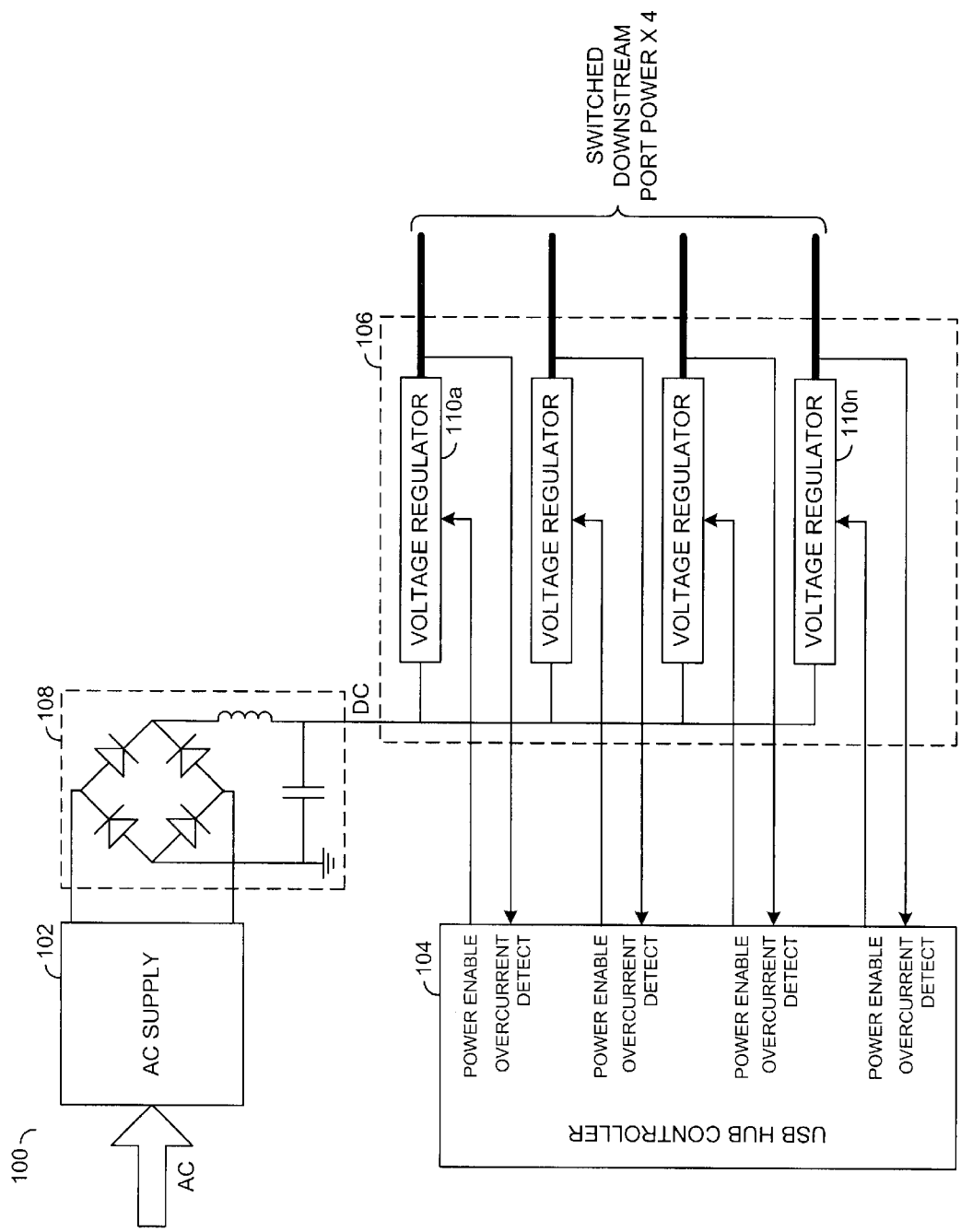
FIG. 2 is a block diagram of a preferred embodiment of the present invention.

Referring to FIG. 2, a block diagram of a circuit (or system) 100 is shown in accordance with a preferred embodiment of the present invention. The circuit 100 may provide a new approach to power management in USB hubs. The circuit 100 generally comprises a circuit 102, a circuit 104, a circuit 106 and a circuit 108. The circuits 102 and 108 may form a first integrated circuit (IC). The circuits 104 and 106 may also form another IC. However, the circuits 102, 104, 106, and 108 may be implemented on the same package. The circuit 102 may be implemented as a power supply. In one example, the circuit 102 may be implemented as an AC supply device. The circuit 104 may be implemented as a Universal Serial Bus (USB) hub controller having a number of ports 105a–105n, where n is an integer. The circuit 106 may be implemented as a regulator (or power management) circuit. The circuit 106 may be configured to power a number of downstream devices (not shown). The circuit 108 may be configured to provide a supply voltage to the circuit 106. In one example, the circuit 108 may be implemented as an AC/DC converter.

The circuit 102 may receive an alternating current voltage (e.g., AC). The circuit 102 may also supply a signal to the conversion circuit 108. The conversion circuit 108 may provide an unregulated direct current (DC) voltage (e.g., DC) to the power management circuit 106. The power management circuit 106 generally comprises a number of circuits 110a–110n. Each of the circuits 110a–110n may provide voltage regulation of the unregulated DC supply. The voltage regulators 110a–110n may provide overcurrent detection to the hub controller 104. Additionally, the hub controller 104 may enable and/or disable each of the voltage regulators 110a–110n. The circuit 100 may provide improvements in conventional USB hub power management techniques via the power management circuit 106. The circuit 100 may also reduce costs for hub manufacturers, since the voltage regulators 110a–110n are low power regulators.

The circuit 100 may implement a low cost AC supply device (e.g., the unregulated AC supply 102) and internally regulate the voltage (e.g., with the voltage regulators 110a–110n). The circuit 100 may implement thermal protection features of a regulator to detect overcurrent via a signal (e.g., OVERCURRENT_DETECT). The circuit 100 may optionally use a shutdown feature of the regulators 110a–110n to switch power via a signal (e.g., POWER_ENABLE). In one example, the regulators 110a–110n may be switched simultaneously by driving a gang switch.

The circuit 100 may allow for a reduction in USB hub manufacturing costs. The circuit 100 may implement the voltage regulators 110a–110n to implement USB hub power management. Shutdown pins of the voltage regulator 110–110n may provide individual port switching. The circuit 100 may shutdown power to a particular pin to control a downstream device. The circuit 100 may provide isolation from the effects of changes in current or voltage between adjacent ports 105a–105n. The circuit 100 may allow the cost of a self-powered USB hub to be reduced to previously unachievable levels.

The hub controller 104 may implement an external AC supply (e.g., the AC supply 102). The circuit 108 may contain a simple bridge rectifier and LC smoothing circuit to generate the unregulated DC voltage (e.g., the signal DC). Thus, each downstream USB device is supplied from a low cost 500 mA voltage regulator (e.g., the voltage regulators 110a–110n).

Some voltage regulators do not support voltage switching. Therefore, for such a case the circuit 100 may implement a single downstream port power switch separate from the voltage regulators 110a–110n to provide gang switched, individual port overcurrent detection.

The 5.0V, 500 mA voltage regulators 110a–110n may have internal thermal overload protection. Thus, if excessive current is drawn from the DC voltage regulator 110a for a sustained period, the regulator 110a may turn off automatically as a result of the thermal effects of the excessive current drawn. While the thermal nature of the detection makes the actual current vary dependent on the ambient temperature and device tolerance, the thermal protection feature will normally be triggered before an unsafe amount of energy is supplied and ensure that the safety objective of overcurrent detection in USB hubs is met.

If the thermal protection feature is activated, the voltage on the downstream power supply will fall to zero. The hub controller 104 may then detect that a port overcurrent event has taken place by simply sensing the CMOS logic level of the downstream bus voltage on the signal OVERCURRENT_DETECT.

The circuit 100 may also provide power management of individual port power switching. The,circuit 100 may be used in the stand-alone, self-powered USB hub market. Cost reductions in the power management of hubs will be particularly welcomed by hub vendors who are planning to support USB 2.0, since the cost of a USB 2.0 hub controller ICs is significantly higher than USB 1.1 hub ICs.

The circuit 100 may simplify and provide cost reductions of self-powered USB hubs. The circuit 100 may provide a USB hub where each downstream port may have a voltage regulator. The voltage regulators may have the dual function of regulating the downstream voltage and implementing downstream port power management. The circuit 100 may further detect overcurrent in a USB hub system.

The circuit 100 may implement thermal protection in the voltage regulators 110a–110n to provide port overcurrent detection in a USB hub. Additionally, the circuit 100 may implement a shutdown feature of a voltage regulators 110a–110n to provide port power switching. The circuit 100 may allow for significant cost reductions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:

a controller including a plurality of ports;

a voltage supply circuit configured to generate an unregulated voltage supply; and a plurality of voltage regulators each configured (i) to receive said unregulated voltage supply, (ii) to present an independently regulated power supply voltage to a respective one of said plurality of ports and (iii) to provide automatic overcurrent protection to said respective port.

2. The apparatus according to claim 1, wherein each of said plurality of voltage regulators is configured to control the regulation of a downstream voltage and provide power management for said respective port.

3. The apparatus according to claim 1, wherein each of said plurality of voltage regulators is configured to turn off automatically in response to an overcurrent condition in order to provide independent overcurrent protection to said respective port.

4. The apparatus according to claim 1, wherein said apparatus is configured to manage power of said plurality of ports.

5. The apparatus according to claim 1, wherein said plurality of voltage regulators further comprise a shutdown feature.

6. The apparatus according to claim 5, wherein:

said plurality of voltage regulators are independently shutdown in response to one or more control signals; and said controller is configured to generate said one or more control signals.

7. The apparatus according to claim 5, wherein said plurality of voltage regulators are shutdown together.

8. The apparatus according to claim 1, wherein said voltage supply circuit comprises:

one or more diodes configured to receive an AC voltage supply; and a capacitor coupled to said one or more diodes.

9. The apparatus according to claim 1, wherein said apparatus comprises a self-powered USB hub.

10. The apparatus according to claim 1, wherein said power management circuit is configured to regulate power to one or more downstream devices.

11. An apparatus comprising:

means for receiving an unregulated voltage supply; and means for presenting a regulated power supply voltage to each of one or more ports of a controller in response to power supplied from said unregulated voltage supply, wherein each of said regulated supply voltages is independently regulated.

12. A method for providing power management to a plurality of ports of a controller, comprising the steps of:

(A) receiving an unregulated voltage supply;

(B) generating a regulated power supply voltage to each of said plurality of ports via a plurality of voltage regulators configured to (i) receive said unregulated voltage supply and (ii) turn off automatically in response to an overcurrent condition on a respective one of said plurality of ports.

13. The method according to claim 12, wherein said plurality of voltage regulators are configured for:
   automatically turning off said regulated supply voltage to each of said plurality of ports in response to thermal effects of said overcurrent condition.

14. The method according to claim 12, further comprising the step of:
   independently switching off each of said plurality of voltage regulators in response to a control signal from a respective one of said one or more ports.

15. The method according to claim 12, further comprising the step of:
   detecting an overcurrent condition of each of said plurality of ports in response to a voltage level of a respective one of said independently regulated supply voltages.

16. The method according to claim 12, further comprising the step of:
   switching said unregulated supply voltage to manage power to one or more down stream devices coupled to said one or more ports.

17. The method according to claim 12, further comprising the step of:
   generating said unregulated voltage supply in response to an external AC voltage supply.

18. The apparatus according to claim 1, wherein said controller is configured to detect an overcurrent condition of each of said plurality of ports in response to a voltage level of a respective one of said independently regulated supply voltages.

19. The apparatus according to claim 1, wherein said voltage supply circuit is configured to generate said unregulated supply voltage in response to an external AC voltage supply.

20. The apparatus according to claim 1, wherein:
   each of said one or more voltage regulators is configured to turn off said independently regulated power supply voltage in response to thermal effects of an overcurrent condition.

* * * * *